US012693189B2

(12) United States Patent
Chiang et al.

(10) Patent No.:   US 12,693,189 B2
(45) Date of Patent:      Jul. 28, 2026

(54) HIGH-PRECISION SENSING PUSHROD

(71) Applicant: Vonnex Technology Ltd., Taipei City (TW)

(72) Inventors: Shu-Hsun Chiang, Hsinchu City (TW); Ying-Yao Huang, Taipei City (TW); Yuh-Puu Han, Taipei City (TW)

(73) Assignee: Vonnex Technology Ltd., Taipei (TW)

( * ) Notice: Subject to any disclaimer, the term of this patent is extended or adjusted under 35 U.S.C. 154(b) by 267 days.

(21) Appl. No.: 18/744,789

(22) Filed: Jun. 17, 2024

(65) Prior Publication Data

US 2025/0277715 A1      Sep. 4, 2025

(30) Foreign Application Priority Data

Mar. 4, 2024    (TW) ................................. 113107721

(51) Int. Cl.
H05B 47/19         (2020.01)
G01M 7/02          (2006.01)
(52) U.S. Cl.
CPC ............ G01M 7/027 (2013.01); H05B 47/19 (2020.01)
(58) Field of Classification Search
CPC ............................... G01M 7/027; H05B 47/19
See application file for complete search history.

(56) References Cited

U.S. PATENT DOCUMENTS

| | | | |
|---|---|---|---|
| 11,913,828 B2 * | 2/2024 | Hara ........................ | G01H 1/00 |
| 2014/0366635 A1 | 12/2014 | Zusman | |
| 2020/0141794 A1 * | 5/2020 | Hiyama ................. | G10K 11/02 |
| 2022/0146338 A1 * | 5/2022 | Li ........................... | G01H 11/08 |

FOREIGN PATENT DOCUMENTS

| | | |
|---|---|---|
| CN | 101191743 A | 6/2008 |
| CN | 104048746 A | 9/2014 |
| TW | M645736 | 9/2023 |
| WO | 2023282226 A1 | 1/2023 |

OTHER PUBLICATIONS

Search Report for Taiwan counterpart application TW113107721 date Nov. 15, 2024.
(English translation) Search Report for Taiwan counterpart application TW113107721, date Nov. 15, 2024.

* cited by examiner

*Primary Examiner* — Toan N Pham

(57) ABSTRACT

The present invention relates to a high-precision sensing pushrod, comprising a housing, a first sensing element, a second sensing element, a fixed post, a connecting shaft, and a contact block. The high-precision sensing pushrod of the present invention contacts a test object directly through the contact block to fully and accurately convey the vibration state of the test object. This design can: 1. avoid interference between different signals caused by the reaction force generated when the first and second sensing elements traditionally contact the test object directly, thereby eliminating measurement errors and achieving high-precision micro-vibration detection; and 2. actively or passively suppress the vibration of the test object to achieve precise force and displacement control.

11 Claims, 4 Drawing Sheets

HIGH-PRECISION SENSING PUSHROD

BACKGROUND OF THE INVENTION

1. Field of the Invention

The present invention relates to the technical field of vibration sensing devices, particularly a high-precision sensing pushrod designed for high-precision micro-vibration detection and control. The sensing pushrod is primarily applied in fields requiring highly accurate vibration data, such as semiconductor manufacturing, precision industry, structural monitoring, and other technical fields where subtle vibration perception is needed. The design of the sensing pushrod aims to enhance the accuracy of micro-vibration detection while avoiding challenges present in traditional sensing methods, such as the interference of reaction forces on measurement results. Moreover, the sensing pushrod is capable of providing precise force and displacement control mechanisms in a dynamic vibrating environment, thereby meeting higher technical requirements.

2. Description of the Prior Art

Micro-vibration measurement has many important applications in industrial and scientific research fields. In the field of industrial automation, micro-vibration detection technology has been an essential part of precise machinery control and maintenance. These technologies are used to monitor the operational status of mechanical equipment and identify early signs of fatigue and failure, thereby preventing costly mechanical breakdowns. Micro-vibration sensors are typically deployed on key mechanical components to capture subtle variations in vibration, which may indicate potential performance degradation or mechanical failure. However, traditional sensing technologies are often limited by the sensitivity and accuracy of the sensing elements. Thus, achieving precise force and displacement control in a vibrating environment has become a significant challenge.

In the field of semiconductor manufacturing, micro-vibration detection is more crucial than in other fields, as even extremely minute vibrations can have a significant impact on the chip manufacturing process. High-precision vibration monitoring systems are used to detect and control vibrations on manufacturing equipment, ensuring product quality and production efficiency. This vibration data is then utilized to optimize equipment settings and production processes, thereby increasing chip yield and quality. However, many existing sensing systems struggle to simultaneously capture full micro-vibration signals with high precision and across a wide frequency range of vibrations, limiting their performance in highly demanding semiconductor manufacturing processes.

In prior technologies, micro-vibration sensing devices typically relied on a single type of sensing element for vibration detection. These devices were mostly composed of a single force sensor or accelerometer, thus often facing limitations in terms of accuracy and sensitivity. Furthermore, in traditional micro-vibration detection methods, the reaction force and the vibrational state of the object being measured posed significant challenges to the accuracy of measurement results. When sensing elements directly contacted the object being measured, the interaction forces between them could cause constraining effects that interfered with the original signal, leading to measurement errors, especially when measuring extremely minute vibrations. Such reaction forces adversely impacted the performance of the sensing elements and the reliability of the measurement data, thus limiting the practicality of traditional technologies in high-precision applications. Therefore, reducing or avoiding direct contact and interaction forces between the sensing elements and the object being measured has become the key to improving the accuracy of micro-vibration detection.

Consequently, to overcome the limitations of traditional sensing technologies and to provide more reliable and accurate measurement results to related fields, the inventors of the present invention have dedicated themselves to developing a high-precision sensing pushrod. The high-precision sensing pushrod is specially designed to provide a wider frequency range of vibration detection capabilities and to reduce the reaction forces and possible constraining effects between the sensing elements and the object being measured, thereby significantly enhancing the accuracy and reliability of measurement signals and related controls.

SUMMARY OF THE INVENTION

The primary object of the present invention is to provide a high-precision sensing pushrod, which comprises multiple key components: a housing, two types of sensing elements (a first sensing element and a second sensing element), a fixed post, a connecting shaft, and a contact block. The unique combination and arrangement of these components offer an innovative method to more effectively capture and analyze minute vibration signals. The high-precision sensing pushrod has a wide range of applications, suitable for various industrial and research fields, especially in cases requiring high accuracy and sensitivity in measurements. Furthermore, the design and configuration of the high-precision sensing pushrod of the present invention can be integrated with related dynamic equipment, thereby being integrated into a mechanism that achieves precise force and displacement control in a vibrating environment.

To achieve the above object, an embodiment of the high-precision sensing pushrod according to the present invention comprises:

a housing;

a first sensing element configured within the housing;

a second sensing element configured within the housing;

a fixed post for securing the first sensing element;

a connecting shaft, wherein one end of the connecting shaft is connected to the first sensing element; and a contact block configured at the other end of the connecting shaft;

wherein the second sensing element is connected to the connecting shaft, positioned between the first sensing element and the contact block through the connecting shaft, and affixed to the contact block;

wherein the contact block is designed to directly contact a test object, to avoid the impact of a reaction force generated when the first sensing element and the second sensing element directly contact the test object, thereby enabling the first sensing element and the second sensing element to achieve high-precision detection of micro-vibrations of the test object through the contact block, independently and without mutual interference.

In one embodiment, the contact block is made of a material with shock-absorbing characteristics; when the contact block contacts the test object, one surface of the contact block can partially absorb the random vibration or noise transmitted from the test object; wherein the material may be selected from a range of high polymer materials with ability to absorb some vibration energy without causing measurement error, such as polyurethane.

In one embodiment, the first sensing element of the high-precision sensing pushrod is a force sensor, and the second sensing element is an accelerometer.

In one embodiment, the contact block of the high-precision sensing pushrod is made of a material with high vibrational conductivity. Moreover, the material with high vibrational conductivity is selected from a group consisting of ceramics, metals, synthetic resins, plastic materials, quartz, and any combination thereof.

In one embodiment, the high-precision sensing pushrod further comprises a data processing unit for analyzing micro-vibration data collected from the first sensing element and the second sensing element.

In one embodiment, the high-precision sensing pushrod further comprises a communication module for transmitting the micro-vibration data collected by the first sensing element and the second sensing element and/or processed data/preliminary result obtained from analyzing the micro-vibration data by the data processing unit to a cloud server; and the communication module is an Ethernet interface, transmitting the micro-vibration data and/or processed data/preliminary result to the cloud server via a local area network and/or the Internet. Additionally, all the measured micro-vibration data can be subjected to further analysis and interpretation through mathematical methods, such as Fourier transform, to understand and evaluate the overall structural behavior.

In one embodiment, the communication module of the high-precision sensing pushrod is a wireless communication interface, and the wireless communication interface is selected from a group consisting of a Bluetooth communication interface, ZigBee communication interface, WiMax communication interface, NBIoT communication interface, LoRA communication interface, WiFi communication interface, 4G mobile communication interface, 5G mobile communication interface, and 6G mobile communication interface.

DETAILED DESCRIPTION OF THE PREFERRED EMBODIMENTS

To provide a clearer description of the high-precision sensing pushrod proposed in the present invention, the following will detail a preferred embodiment in conjunction with the accompanying drawings.

Figure 1:
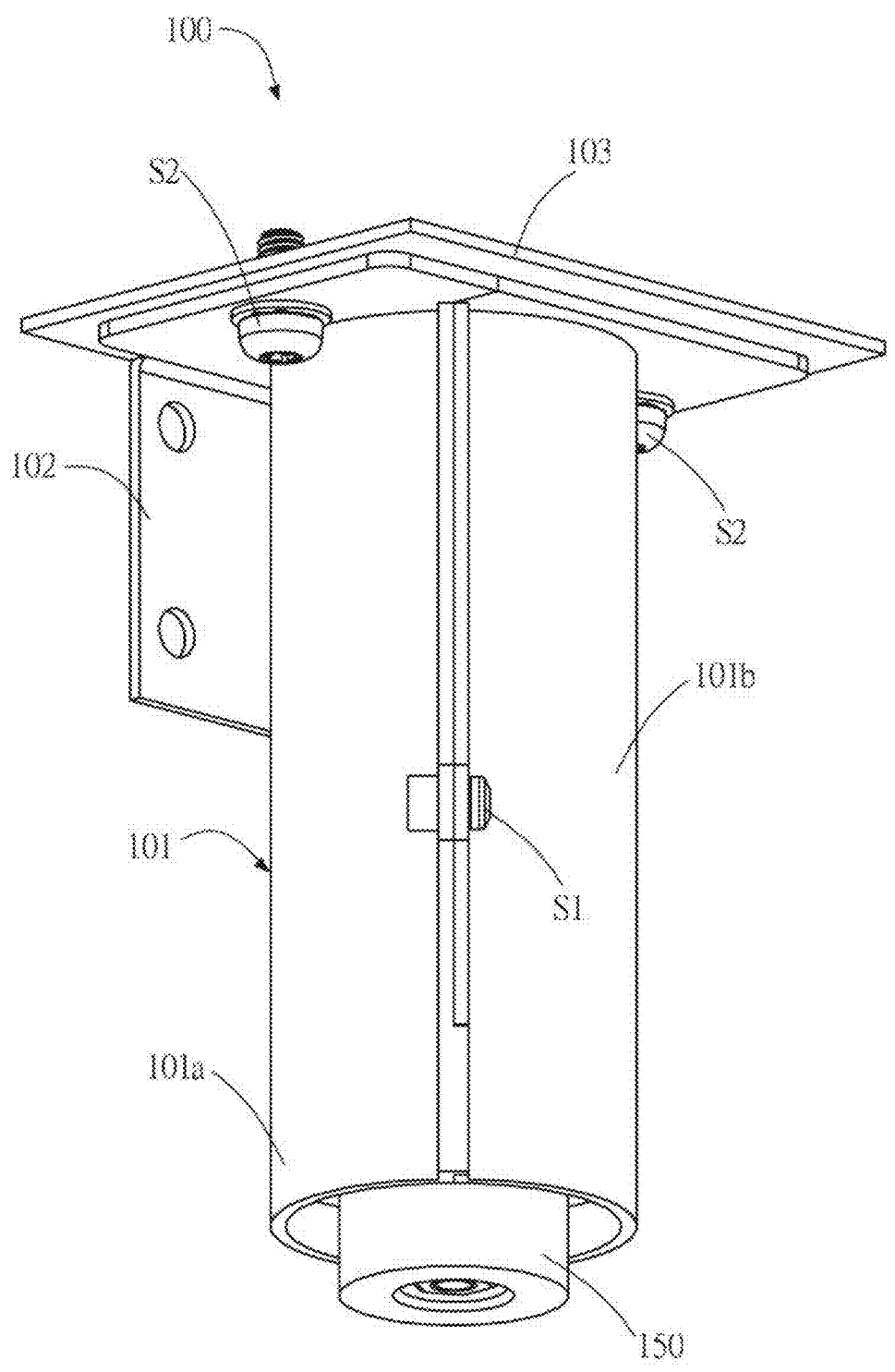
FIG. 1 is an external view of the high-precision sensing pushrod of the present invention.

FIG. 1 is an external view of the high-precision sensing pushrod 100 of the present invention. As shown in FIG. 1, the high-precision sensing pushrod 100 comprises a housing 101, a mounting bracket 102, a top plate 103, and a contact block 150. The housing 101 comprises a first housing 101*a* and a second housing 101*b*, which are joined together by first bolts S1 to form the housing 101 and are each fixed to the top plate 103 by second bolts S2. The high-precision sensing pushrod 100 is positioned to a part of a device via the mounting bracket 102, enabling the contact block 150 to make direct contact with a test object for the detection of micro-vibrations of the test object. The contact block 150, made of a high vibrational conductivity material, ensures complete and efficient transmission of the test object's vibrations to the sensing elements within the housing 101, allowing for precise vibration signal capture and conversion performed by the sensing elements within the housing 101. This arrangement allows the high-precision sensing pushrod 100 of the present invention to accurately monitor and record micro-vibration data without being directly affected by interaction forces (reaction forces) among the sensing elements and the test object.

Figure 2:
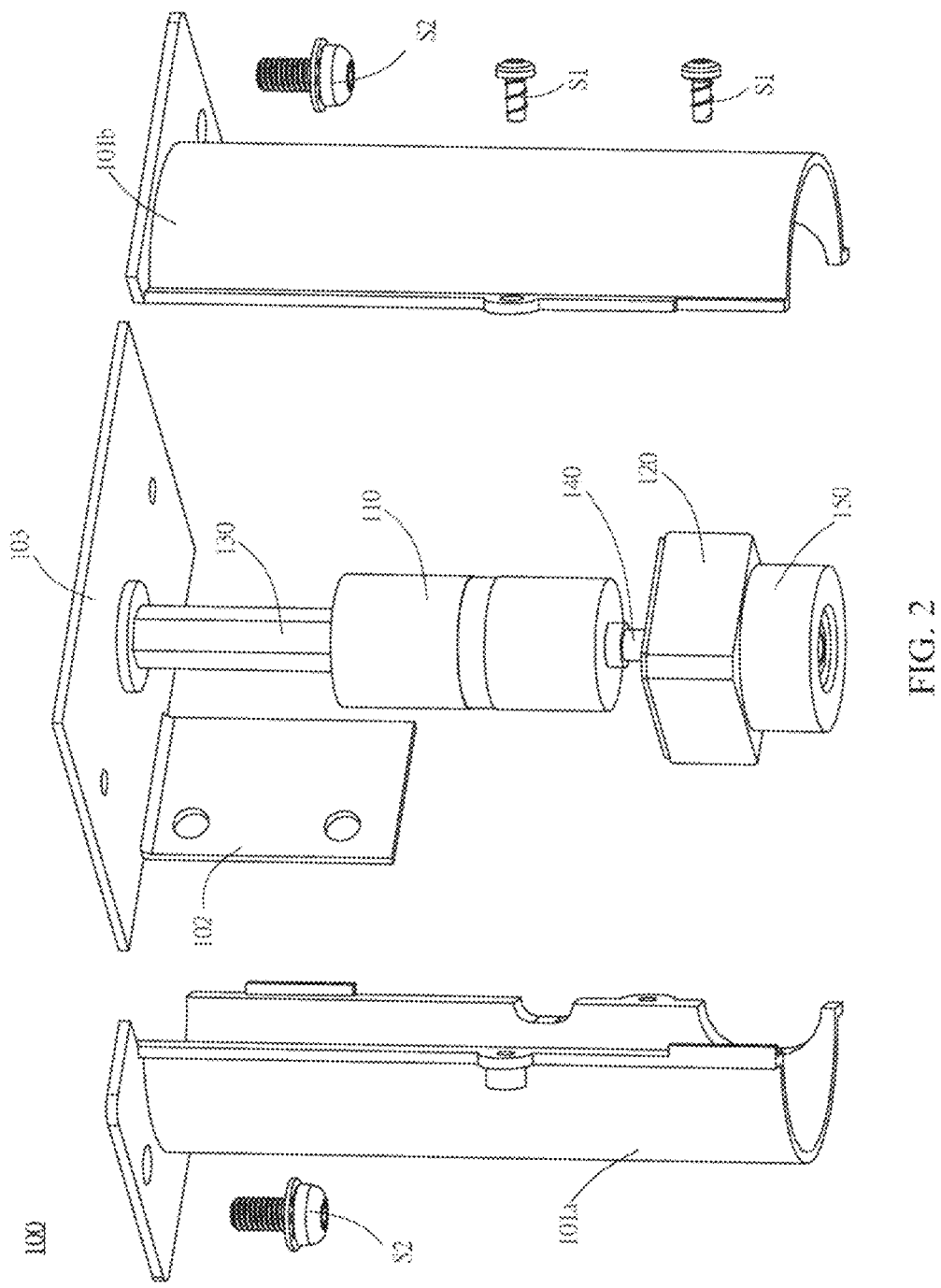
FIG. 2 is an exploded view of an embodiment of the high-precision sensing pushrod of the present invention.

FIG. 2 is an exploded view of an embodiment of the high-precision sensing pushrod 100 of the present invention. As shown in FIG. 2, the high-precision sensing pushrod 100 comprises a first housing 101*a*, a second housing 101*b*, a mounting bracket 102, a top plate 103, two first bolts S1, two second bolts S2, a first sensing element 110, a second sensing element 120, a fixed post 130, a connecting shaft 140, and a contact block 150. The first housing 101*a* and the second housing 101*b* are joined together by the two first bolts S1 to form the housing 101 as illustrated in FIG. 1, and are each mounted to the top plate 103 by the two second bolts S2.

As shown in FIG. 2, the first sensing element 110 and the second sensing element 120 are configured within the housing 101 formed by the first housing 101*a* and the second housing 101*b*, and one end of the fixed post 130 is connected to the top plate 103 and the other end is fixedly connected to the first sensing element 110. One end of the connecting shaft 140 is connected to the first sensing element 110, and the other end is connected to the contact block 150, wherein the second sensing element 120 is arranged between the first sensing element 110 and the contact block 150 through the connecting shaft 140 and is affixed to the contact block 150.

With the configuration shown in FIG. 2, the contact block 150 is designed to make direct contact with a test object, avoiding measurement errors caused by mutual interference between signals generated by the reaction force from the pressure applied to the sensing elements by the vibration of the test object when the first sensing element 110 and the second sensing element 120 directly contact the test object, thereby achieving high-precision detection of the micro-vibrations of the test object by the first sensing element 110 and the second sensing element 120.

Figure 3:
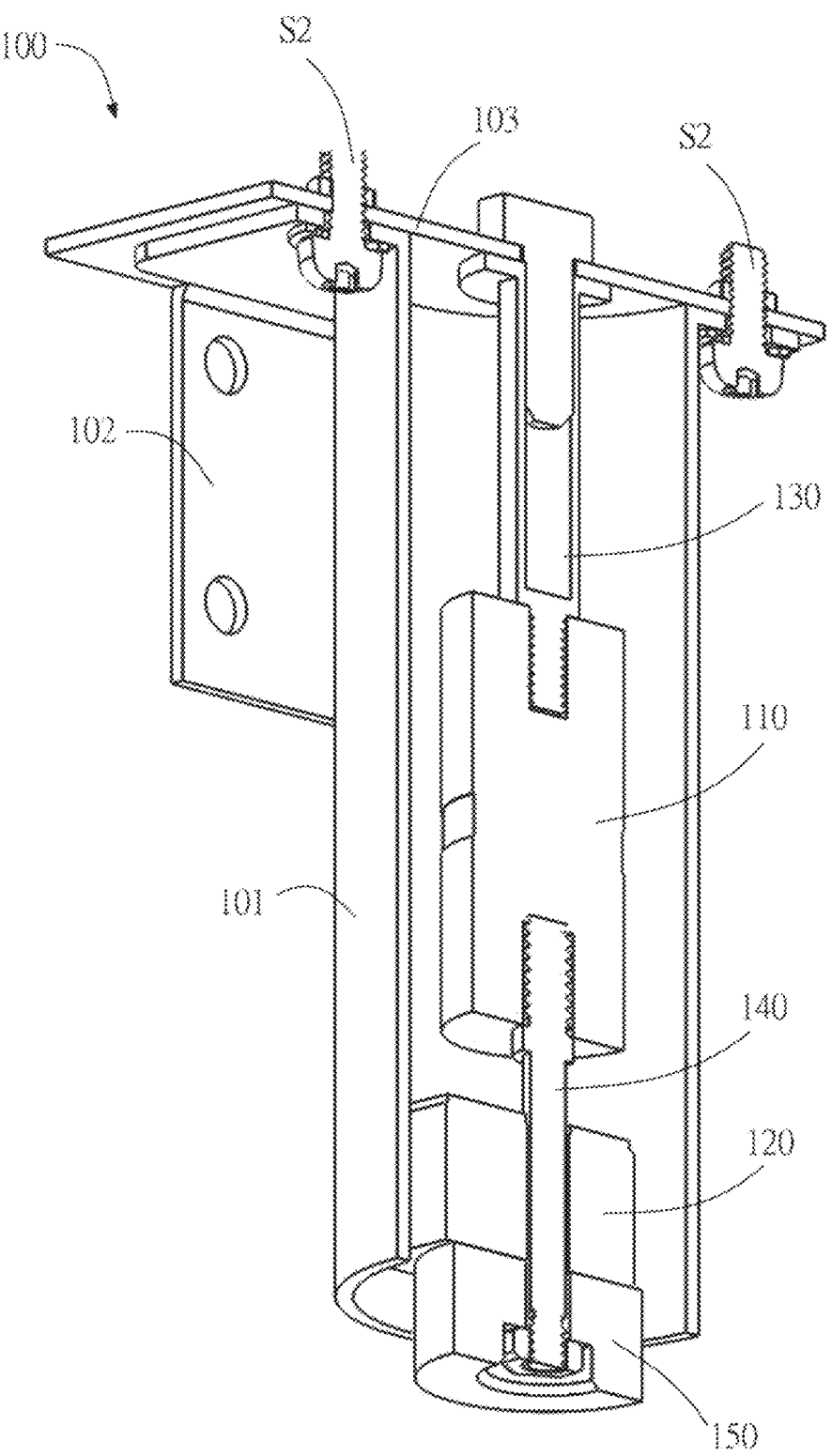
FIG. 3 is a sectional view of an embodiment of the high-precision sensing pushrod of the present invention.

FIG. 3 is a sectional view of an embodiment of the high-precision sensing pushrod 100 of the present invention. FIG. 3 shows the internal structural configuration of the high-precision sensing pushrod 100, wherein one end of the first sensing element 110 is mounted to the fixed post 130, and the other end is mounted to one end of the connecting shaft 140. The other end of the connecting shaft 140 is connected to the contact block 150, wherein the second sensing element 120 is arranged on the connecting shaft 140 and the contact block 150, between the first sensing element 110 and the contact block 150.

In one embodiment, the first sensing element 110 is a force sensor, which can be designed as piezoelectric, strain gauge, or capacitive types. These different types of force sensors provide a wide range of measurement capabilities and high sensitivity owing to their unique measuring principles and characteristics, thereby making them suitable for precise detection ranging from very light to heavy pressures at different response rates.

In one embodiment, the second sensing element 120 is an accelerometer, which may utilize micro-electromechanical systems (MEMS) technology or other high-precision technologies, such as servo or piezoelectric accelerometers. These accelerometers are capable of accurately measuring acceleration in single or multiple directions, including both static and dynamic acceleration changes.

By integrating the aforementioned high-performance sensing elements, the high-precision sensing pushrod 100 of the present invention is capable of simultaneously detecting and recording changes in pressure and acceleration of the test object. This comprehensive data analysis provides a thorough and accurate assessment of micro-vibration events, making the high-precision sensing pushrod 100 of the present invention particularly suitable for fields such as semiconductor manufacturing, precision automated industrial manufacturing, precision engineering applications, seismic monitoring, scientific research, due to its multifunctionality and high sensitivity.

In one embodiment, the contact block 150 of the high-precision sensing pushrod 100 of the present application is made of a material with high vibrational conductivity, wherein the material with high vibrational conductivity is selected from a group consisting of ceramics, metals, synthetic resins, plastic materials, quartz, and any combination thereof. By using such high vibrational conductivity materials, the contact block 150 can completely and efficiently transmit the vibration signals of the test object to the sensing elements, while the choice of materials ensures that the contact block 150 not only has excellent vibration transmission capabilities but also sufficient durability and environmental adaptability to maintain stable performance under various operating conditions. Furthermore, the structural design of the contact block 150 enables it to directly contact the test object, avoiding the reaction force generated by the pressure from the vibrations of the test object acting on the sensing elements when the first sensing element 110 and the second sensing element 120 directly interact with the test object and thereby avoiding measurement errors caused by mutual interference among signals. Therefore, the contact block 150 is a key component of the high-precision sensing pushrod 100 of the present invention, wherein the material and design of the contact block have a decisive impact on the overall performance and accuracy of the sensing device.

In another embodiment, the contact block 150 may be made of a material with shock-absorbing characteristics, such as high polymer materials capable of absorbing vibration energy, like polyurethane. When the contact block 150 contacts the test object, the shock-absorbing characteristics of the contact block can attenuate some of the random vibration energy or noise of the test object transmitted to the sensing elements (force sensors), thereby achieving the objective of precise force and displacement control. Additionally, the shock-absorbing material of the contact block 150 can also achieve active or passive vibration damping: in active damping, a counter-phase suppression signal can be actively output based on the detected vibration signal; in passive damping, the material's inherent shock-absorbing characteristics are used to reduce the unwanted effect of vibration transmission. Thus, even when the test object generates larger vibrations, the contact block 150 can act as a buffer to absorb the impact, minimizing the effect of the vibration on the sensing elements and thereby improving the accuracy of force sensing.

Figure 4:
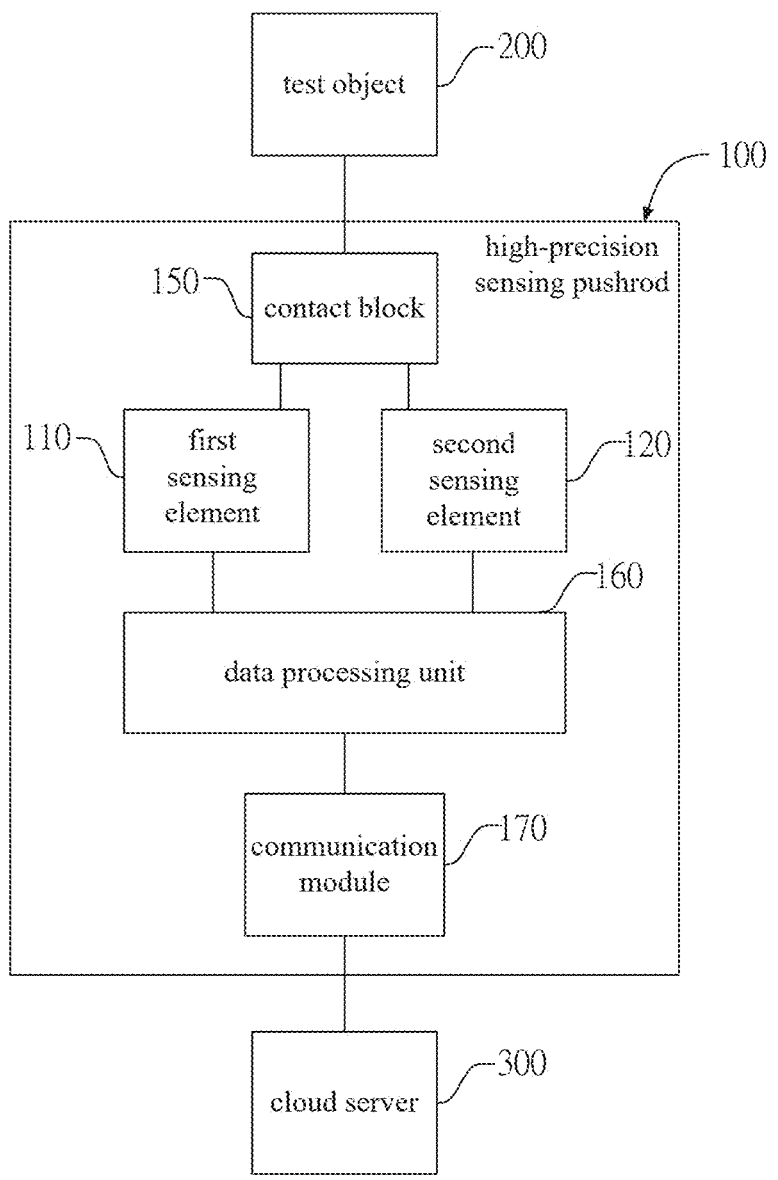
FIG. 4 is a block diagram of an embodiment of the high-precision sensing pushrod of the present invention.

According to FIG. 4, in one embodiment, the high-precision sensing pushrod 100 of the present invention further comprises a data processing unit 160 for the analysis of micro-vibration data collected from the first sensing element 110 and the second sensing element 120. Additionally, the high-precision sensing pushrod 100 further comprises a communication module 170 to transmit the micro-vibration data collected by the first sensing element 110 and the second sensing element 120 through the contact block 150 from the test object 200 and/or analysis data obtained from analyzing the micro-vibration data by the data processing unit to a cloud server 300, facilitating remote monitoring and further data analysis. Moreover, all measured micro-vibration data can be further analyzed and interpreted through mathematical methods, such as Fourier transform, to understand the overall structural behavior.

In one embodiment, the communication module 170 is an Ethernet interface, transmitting the micro-vibration data and/or analysis data to the cloud server 300 via a local area network and/or the Internet. Additionally, the communication module 170 can also be a wireless communication interface, and the wireless communication interface is selected from a group consisting of Bluetooth communication interface, ZigBee communication interface, WiMax communication interface, NBIoT communication interface, LoRA communication interface, WiFi communication interface, 4G mobile communication interface, 5G mobile communication interface, and 6G mobile communication interface.

The above descriptions have comprehensively and clearly introduced the high-precision sensing pushrod of the present invention. It should be emphasized that the above descriptions are based on specific embodiments of the present invention; however, these embodiments are not intended to limit the scope of the present invention, and all equivalent implementations or alterations within the spirit of the present invention still fall within the scope of the present invention.

What is claimed is:

1. A high-precision sensing pushrod, comprising:
a housing;
a first sensing element configured within the housing;
a second sensing element configured within the housing;
a fixed post for securing the first sensing element;
a connecting shaft, wherein one end of the connecting shaft is connected to the first sensing element; and
a contact block configured at the other end of the connecting shaft;
wherein the second sensing element is connected to the connecting shaft, positioned between the first sensing element and the contact block through the connecting shaft, and affixed to the contact block;
wherein the contact block is designed to directly contact a test object, to avoid an impact of a reaction force generated when the first sensing element and the second sensing element directly contact the test object, thereby enabling the first sensing element and second sensing element to achieve high-precision detection of micro-vibrations of the test object through the contact block.

2. The high-precision sensing pushrod of claim 1, wherein the contact block is made of a material with shock-absorbing characteristics, and one surface of the contact block can partially absorb vibrations transmitted from the test object when the contact block contacts the test object.

3. The high-precision sensing pushrod of claim 1, wherein the first sensing element is a force sensor.

4. The high-precision sensing pushrod of claim 1, wherein the second sensing element is an accelerometer.

5. The high-precision sensing pushrod of claim 1, wherein the contact block is made of a material with high vibrational conductivity.

6. The high-precision sensing pushrod of claim 5, wherein the material with high vibrational conductivity is selected from a group consisting of ceramics, metals, synthetic resins, plastic materials, quartz, and any combination thereof.

7. The high-precision sensing pushrod of claim 1, further comprising a data processing unit for analyzing micro-vibration data collected from the first sensing element and the second sensing element.

8. The high-precision sensing pushrod of claim 7, further comprising a communication module for transmitting the micro-vibration data collected by the first sensing element and the second sensing element and/or analysis data obtained from analyzing the micro-vibration data by the data processing unit to a cloud server.

9. The high-precision sensing pushrod of claim 8, wherein the communication module is an Ethernet interface, and transmits the micro-vibration data and/or analysis data to the cloud server via a local area network and/or the Internet.

10. The high-precision sensing pushrod of claim 8, wherein the communication module is a wireless communication interface.

11. The high-precision sensing pushrod of claim 10, wherein the wireless communication interface is selected from a group consisting of Bluetooth communication interface, ZigBee communication interface, WiMax communication interface, NBIoT communication interface, LoRA communication interface, WiFi communication interface, 4G mobile communication interface, 5G mobile communication interface, and 6G mobile communication interface.

* * * * *